United States Patent
Radovnikovic

(10) Patent No.: US 9,392,075 B1
(45) Date of Patent: Jul. 12, 2016

(54) URLS WITH IP-GENERATED CODES FOR LINK SECURITY IN CONTENT NETWORKS

(71) Applicant: HAProxy Holdings, Inc., Wilmington, DE (US)

(72) Inventor: Dujko Radovnikovic, Boston, MA (US)

(73) Assignee: HAProxy Holdings, Inc., Wilmington, DE (US)

( * ) Notice: Subject to any disclaimer, the term of this patent is extended or adjusted under 35 U.S.C. 154(b) by 0 days.

(21) Appl. No.: 14/807,737

(22) Filed: Jul. 23, 2015

(51) Int. Cl.
| | |
|---|---|
| G06F 7/04 | (2006.01) |
| G06F 15/16 | (2006.01) |
| G06F 15/173 | (2006.01) |
| H04L 29/08 | (2006.01) |
| H04L 29/12 | (2006.01) |
| H04L 29/06 | (2006.01) |
| G06F 21/10 | (2013.01) |
| G06F 21/31 | (2013.01) |
| G06F 21/62 | (2013.01) |

(52) U.S. Cl.
CPC .............. *H04L 67/32* (2013.01); *G06F 21/10* (2013.01); *G06F 21/31* (2013.01); *G06F 21/6209* (2013.01); *H04L 61/2503* (2013.01); *H04L 63/08* (2013.01); *H04L 63/10* (2013.01); *H04L 63/101* (2013.01); *H04L 63/16* (2013.01); *H04L 63/164* (2013.01); *H04L 61/6068* (2013.01); *H04L 67/42* (2013.01)

(58) Field of Classification Search
CPC ....... H04L 67/42; H04L 63/10; H04L 63/164; H04L 63/16; H04L 63/08; H04L 63/101; H04L 67/32; H04L 61/2503; H04L 61/6068; G06F 21/31; G06F 21/10; G06F 21/6209
USPC ....................... 709/219, 225, 229, 245; 726/2
See application file for complete search history.

(56) References Cited

U.S. PATENT DOCUMENTS

| | | | | |
|---|---|---|---|---|
| 2002/0111967 | A1* | 8/2002 | Nagase | G06F 17/30905 715/234 |
| 2002/0147929 | A1* | 10/2002 | Rose | G06F 21/335 726/10 |
| 2006/0036693 | A1* | 2/2006 | Hulten | H04L 12/585 709/206 |
| 2008/0201493 | A1* | 8/2008 | Richardson | 710/15 |
| 2012/0158626 | A1* | 6/2012 | Zhu | H04L 63/1408 706/13 |
| 2015/0281331 | A1* | 10/2015 | Steiner | H04L 67/10 709/203 |

\* cited by examiner

*Primary Examiner* — Daniel C Murray
(74) *Attorney, Agent, or Firm* — Kilpatrick Townsend & Stockton, LLP

(57) ABSTRACT

A CDN may include a plurality of PoPs that are geographically distributed, a plurality of edge servers that are distributed among the PoPs storing content and responding to content requests, and an edge server in the plurality of edge servers. The edge server may be configured to receive, from a client device, a request for content. The request for content may include an IP address associated with the client device, and a URL comprising a first code. The edge server may also be configured to generate a second code using the IP address received from the client device, determine whether the first code matches the second code, retrieve content in the CDN that is responsive to the request for content if the first code matches the second code, and send the content to the client device if the first code matches the second code.

16 Claims, 10 Drawing Sheets

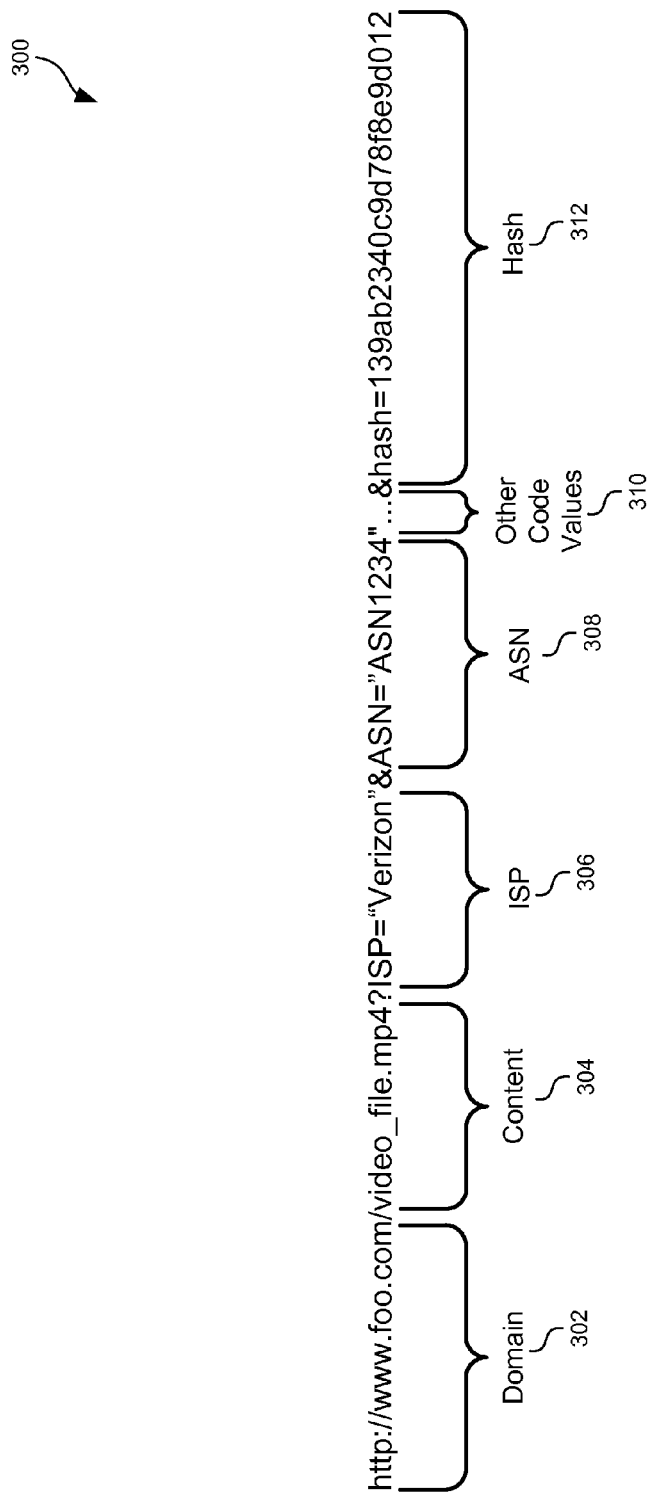

URLS WITH IP-GENERATED CODES FOR LINK SECURITY IN CONTENT NETWORKS

BACKGROUND

This disclosure generally relates to decoding links in a storage network, and specifically, but not by way of limitation, to providing secure content links for mobile devices.

Hotlinking (also known as inline-linking, leaching, or direct linking) involves linking a content object stored on a server by a first party to a webpage belonging to a second party. In one common scenario, the first party can provide webpage information via a web server that links to content objects stored by a Content Delivery Network (CDN). The content objects may include large media files, such as images and videos that can be more efficiently distributed by a CDN than by the first party's web server. The links in the webpage will direct the user's browser to the CDN, which can then retrieve the content objects to be displayed/played in the user's browser. The CDN will typically charge the first party for both the storage and delivery of its content. The more bandwidth that is used to provide content to users, the more the first party will be charged by the CDN.

When the second party engages in hotlinking, it copies the links from the first party's webpage and embeds the links in its own webpage. When users display the second party's webpage, the users' browsers will be directed to the content stored in the CDN by the first party. The CDN will record the transmission of the content belonging to the first party without being able to distinguish between users following the original link of the first party and users following the copied link of the second party. This results in the first party being charged to source and provide content for the webpage of the second party. In some cases, approximately 30% of the first party's CDN costs may go to sourcing content for other parties webpages that are hotlinking the first party's content.

BRIEF SUMMARY OF THE INVENTION

In some embodiments, a Content Delivery Network (CDN) may include a plurality of Points of Presence (PoPs) that are geographically distributed, a plurality of edge servers that are distributed among the PoPs storing content and responding to content requests, and an edge server in the plurality of edge servers. The edge server may be configured to receive, from a client device, a request for content. The request for content may include an Internet Protocol (IP) address associated with the client device, and a Uniform Resource Locator (URL) comprising a first code. The edge server may also be configured to generate a second code using the IP address received from the client device, determine whether the first code matches the second code, retrieve content in the CDN that is responsive to the request for content if the first code matches the second code, and send the content to the client device if the first code matches the second code.

In some embodiments, a method of securely providing access to web content in a network may include receiving, at a server in a CDN and from a client device, a request for content. The request for content may include an Internet Protocol (IP) address associated with the client device, and a Uniform Resource Locator (URL) comprising a first code. The method may also include generating a second code using the IP address received from the client device, and determining, by the server, whether the first code matches the second code. The method may additionally include retrieving, based on the URL, content in the CDN that is responsive to the request for content if the first code matches the second code, and sending the content to the client device if the first code matches the second code.

In some embodiments, a non-transitory, computer readable medium for a CDN, the medium including instructions that, when executed by one or more processors, causes the one or more processors to receive, from a client device, a request for content. The request for content may include an Internet Protocol (IP) address associated with the client device, and a Uniform Resource Locator (URL) including a first code. The instructions may also cause the one or more processors to generate a second code using the IP address received from the client device, and determine whether the first code matches the second code. The instructions may further cause the one or more processors to retrieve content in the CDN that is responsive to the request for content if the first code matches the second code, and send the content to the client device if the first code matches the second code.

In various implementations of these embodiments, the following features may be included in any combination and without limitation. Generating the second code using the IP address may include looking up the second code in a database that is indexed using the IP address, wherein the database in internal to the CDN. The first code may include an Autonomous System Number (ASN). The first code may include an Internet Service Provider (ISP) identifier. The first code may include a geographical location. Generating the second code using the IP address received from the client device may include sending the IP address to a third-party service through a web interface, where the third-party service includes a database of codes that can be retrieved using IP addresses, and receiving the second code from the third-party service. The URL further may further include the IP address and a first hash value, the method and/or processor operations further include computing a second hash value from the URL, determining whether the second hash value matches the first hash value, and determining whether the IP address in the URL matches the IP address in the request for content. The method and/or processor operations may also include, before receiving the request for content from the client device, receiving the IP address from a web server that provides a web page to the client device, generating the first code using the IP address, and sending the second code to the web server, where the webserver uses the first code to generate the URL. The second code may correspond to a range of valid IP address.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 3 illustrates an encoding of a URL, according to some embodiments.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1A:
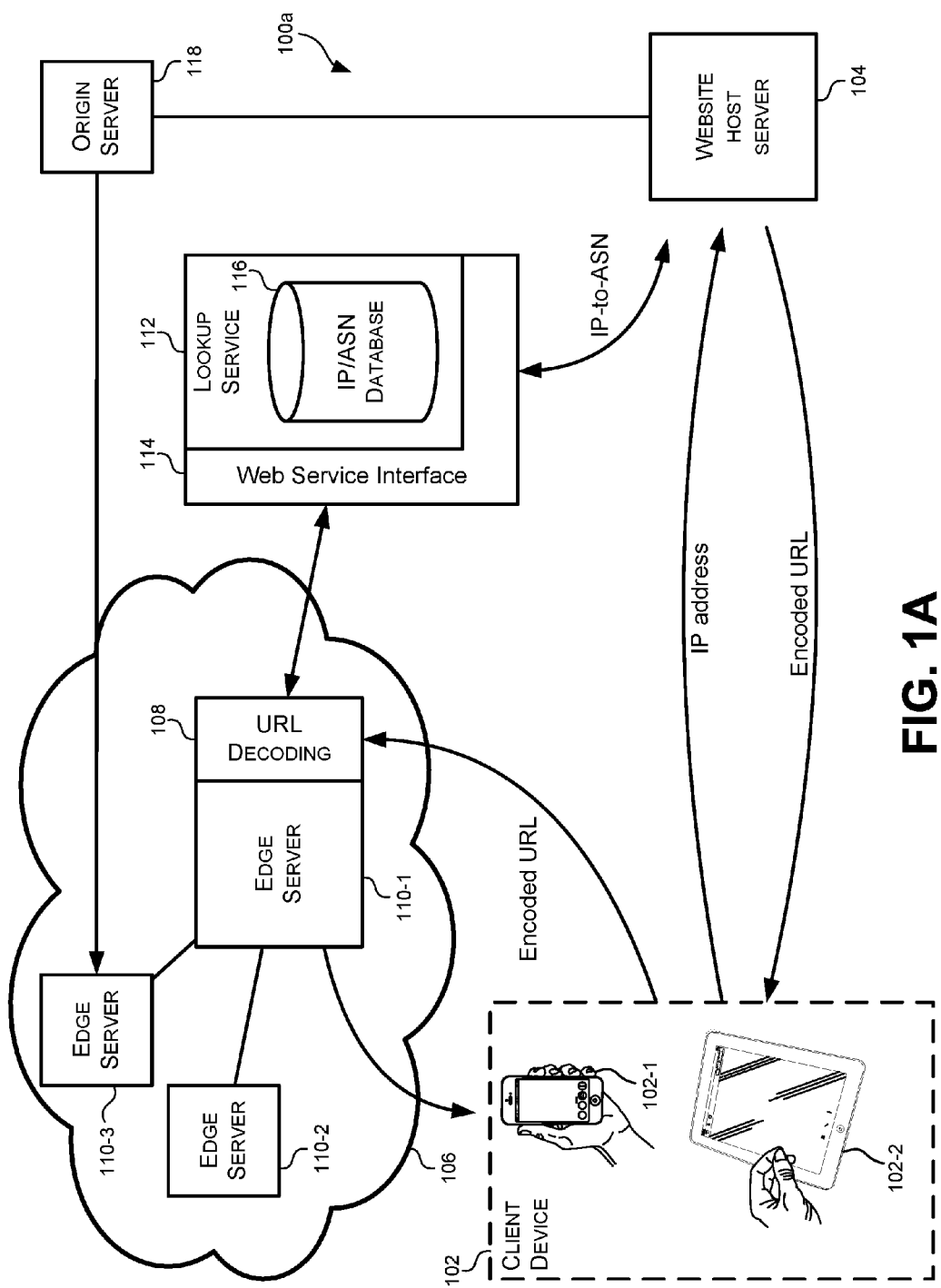
FIG. 1A illustrates a simplified block diagram of a content delivery network and web server that use link security for content delivery, according to some embodiments.

FIG. 1A illustrates a simplified block diagram 100a of a Content Delivery Network (CDN) 106 and web server that use link security for content delivery, according to some embodiments. In order to describe various embodiments, this disclosure will refer to a number of different entities. The CDN 106 may generally describe an entity that provides content delivery services throughout a large service area by providing geographically distributed Points of Presence (PoPs). Each PoP may include a plurality of servers, referred to as "edge servers" 110 (110-1, 110-2, 110-3) that cache static content objects used by webpages. While these content objects may include any type of content, such as text documents, database objects, HTML code, and so forth, the CDN 106 will most commonly store media files, such as music, video, and/or images.

A "customer" of the CDN 106 may generally refer to a content owner that provides a webpage for users to access the content objects. The webpage will typically be provided by a web server 104, and will include links to the content objects that are stored in the CDN 106. When a user accesses the customer's web server 104, the web server 104 will transmit the HTML code for displaying the webpage to the user's browser. The HTML code will include links to the contact objects stored in the CDN 106. The user's browser can then automatically, or in response to a user input (e.g. a "mouse click"), use the links to request the content objects from the CDN 106. The CDN 106 uses a URL in each content link to locate cached versions of the content objects stored on one of its edge servers. Generally, the CDN 106 will attempt to locate a copy of the content objects that are located in a PoP that is geographically near the user in order to reduce the latency of the transmission.

As used herein, the term "customer" will refer to a customer of the CDN 106. In many embodiments, the customer will be the content owner that originates the content and the webpage. The web server 104 may be hosted by the customer, or it may be hosted by the CDN 106. The customer typically provides content to the CDN 106 through an origin server 118, and copies of the content will be propagated throughout the CDN cache such that copies will be stored on various edge servers 110 throughout the CDN 106 based on usage, customer preference, policies of the CDN 106, and so forth. The customer can be distinguished from the "user" in that the user will typically refer to an entity that is requesting the webpage from the web server 104 and viewing the content stored in the CDN 106. The user will typically use a "client device" 102, such as a personal computer, laptop computer, a tablet computer 102-2, a smartphone 102-1, a PDA, and so forth.

When a third party engages in hotlinking, the third party will request the webpage from the web server 104 and copy the content links. The third-party then develops their own webpage and includes those content links in the HTML code. When a user requests the third-party webpage, the user's browser will see the content links and go to the CDN 106 to retrieve the content. In the past, the CDN 106 did not actively distinguish where those content links originated. Therefore, the CDN 106 would simply provide the content to any client device that provided the correct links.

In order to thwart hotlinking by third-party webpages, a customer can work with the CDN 106 to encode the content links, or Uniform Resource Locators (URLs), such that the URLs will only be valid when accessed through the customer's webpage. The CDN 106 can then decode the encoded URLs and only provide the content objects when the encoded URLs are valid. As used herein, the term "encoding" may include any process for transforming information into another form, such as using a hashing function to generate a hash value.

One method of encoding URLs involves using the Internet Protocol (IP) address of the client device 102. Transmissions over the Internet use the Open Systems Interconnection (OSI) model, which divides communication functions into logical layers. When a request is sent over the Internet, the IP address of the client device 102 is part of the link layer of the OSI model. For example, when the client device 102 requests a webpage from the web server 104, part of that transmission will include the IP address of the client device 102. This allows the web server 104 to know the network location of the client device 102 such that the web server 104 can respond by sending the client device 102 the webpage. In one method of defeating hotlinking, the web server 104 can encode the URLs for content objects using the IP address of the client device 102. For example, in response to receiving a request for a webpage from the client device 102, the web server 104 can append the IP address of the client device 102 to the URL of content objects stored in the CDN 106. The web server 104 can then generate a hash value using a secret value (e.g. a cryptographic key) and append the hash value to the URL along with the IP address of the client device 102 to generate an encoded URL. When the client device 102 receives the encoded URL, the browser operating on the client device 102 will send the encoded URL to the CDN 106. As with the original request for the webpage to the web server 104, the content request to the CDN 106 will also include the IP address of the client device 102 in the link layer of the transmission. The CDN 106 may include a URL decoding process 108 that can determine whether the encoded URL sent from the client device 102 is valid. For example, prior to this content request, the secret value used to generate the hash in the encoded URL at the web server 104 can be shared with the CDN 106. The URL decoding process 108 can then extract the raw URL (i.e. the address path of the content) from the encoded URL, append the IP address received in the link layer from the client device 102 and generate a hash based on the raw URL, the IP address, and the shared secret value. If the hash generated by the URL decoding process 108 matches the hash appended to the end of the encoded URL received from the client device 102 and if the IP addresses match, then the link can be considered valid such that it was requested by a user through the webpage provided by the web server 104 of the customer.

Using the IP address to encode content URLs can defeat hotlinking in certain instances because the IP address of the device originally requesting the content URLs from the web server 104 will not match the IP address of the client device 102 requesting the content object. For example, if the third-party requested the webpage from the web server 104, each content URL sent from the web server 104 would be encoded using the IP address of the computing device of the third party. When the third-party then post those encoded URLs in their own webpage, a client device 102 requesting the webpage from the third-party will receive URLs encoded with the IP address of the third-party. When the browser or flash player in the client device 102 sends the encoded URLs to the CDN 106, the CDN will receive the IP address of the client device 102 in the link layer of the transmission. The URL decoding process 108 will then decode URLs, which will not be found valid because the IP address in the encoded URLs will not match the IP address of the client device 102. If the third-party attempts to change the IP address in their URLs, the hash value will not match because the third party does not have the secret value shared between the CDN 106 and the web server 104.

Encoding URLs using the IP address of the client device 102 is enough to thwart hotlinking in many situations. However, as technology advances, situations are beginning to commonly arise in which encoding URLs using the IP address of the client device 102 not only prevents hotlinking, but can also prevent bona fide users of the web server 104 from accessing content in the CDN. One particular situation may arise in the use of mobile client devices 102. Modern client devices 102 such as smart phones 102-1 and Wi-Fi-enabled tablets 102-2 may change IP addresses one or more times during a single communication session. For example, a user may use his/her smartphone 102-1 to access a webpage provided by the web server 104. When the user is in their home, the smartphone 102-1 may connect to the web server 104 through a home Wi-Fi network with a Wi-Fi router. The IP address in the link layer of the transmission to the web server 104 will typically be an address associated with the router of the home Wi-Fi network. If the user then leaves their house, the connection with the home Wi-Fi network may be interrupted, and the smartphone 102-1 made automatically connect to a cellular data network, such as the Verizon® LTE network. Transmissions from the smartphone 102-1 will then be assigned an IP address by the cellular data network. As the user moves between cellular base stations, the IP address assigned by the cellular data network may change dynamically during the same web session. If the user then enters a recognized Wi-Fi hotspot or other Wi-Fi network (e.g., a private Wi-Fi network at the user's place of business), the smart phone 102-1 may automatically disconnect from the cellular data network and connect to the new Wi-Fi network. If the user sits down at their desk and connects their smart phone 102-1 to their desktop computer through a USB cable, Internet transmissions may then connect through a wired broadband/DSL network connected to the desktop computer. Internet transmissions would then include the IP address of the desktop computer through the broadband/DSL connection.

As the user moves geographically as described in the scenario above, the IP address may change one or more times during the same session with the webpage received from the web server 104. For example, the user may be listening to a streaming podcast or watching a lengthy video as they commute between home and work. Because content objects may be streamed or divided into chunks that are provided intermittently between the CDN 106 and the client device 102, changing the IP address of the client device may interrupt playback of the content object. For example, the user can begin listening to a podcast as they leave their home, and when their smart phone 102-1 requests the second half of the podcast, the IP address of the smartphone 102-1 will change. This will cause the URL decoding process 108 to identify the link provided by the smart phone 102-1 as invalid in the same way that it would identify a hotlink as invalid.

In order to provide secure content URLs for mobile devices that may switch IP addresses during a single communication session with the web server 104, some embodiments described herein may use alternate URL encodings. In one embodiment, a lookup service 112 may be accessed that can receive an IP address and return an Autonomous System Number (ASN) associated with the IP address. An Autonomous System is a group of IP networks operated by one or more network operators that has a single and clearly defined set of external routing protocols that are used to exchange information between Autonomous Systems. Each Autonomous System may be assigned a globally unique identification number, or ASN. This number can be used both in the exchange of routing information between Autonomous Systems and within the Autonomous System itself. For example, networks provided by Internet service providers may each be assigned an ASN. For example, a Verizon® wireless network may be assigned the ASN numbers AS6167, AS22394, and so forth. Networks may be provided in different geographic locations by the same service provider, and each of these networks may have their own ASN. For example, Sprint® may use different ASN's (AS 1791, AS4005, AS42451) for Sprint® networks in various countries.

In some embodiments, the client device 102 can send the request for a webpage to the web server 104 with the IP address of the client device 102 in the link layer of the request transmission. Instead of encoding content URLs using the IP address, the web server 104 can submit the IP address of the client 102 to the lookup service 112. The lookup service 112 may include a database 116 that maps IP addresses to their ASNs. The lookup service 112 may include a web service interface 114, an API, or another type of interface through which such requests may be received. The lookup service 112 can then return the ASN to the web server 104. The web server 104 can then encode content URLs using the ASN assigned to the client device 102. For example, the web server 104 can append a parameter identifying the ASN to the content URL, and then generate a hash value using the URL with the appended ASN and a secret value that is shared with the CDN 106. The encoded URL can then be transmitted back to the client device 102.

When a web browser, flash player, and/or the like, operating on the client device 102 attempts to play/display the content associated with the encoded URL, the client device 102 can send a request to the CDN 106 that includes encoded URL. In some embodiments, the URL decoding process 108 will receive the encoded URL, along with the IP address of the client device 102 in the link layer of the transmission from the client device 102. Instead of simply decoding the encoded URL with the IP address of the client device 102, the URL decoding process 108 can send the IP address of the client device 102 to the lookup service 112. The lookup service can then provide the ASN associated with the IP address of the client device 102. The URL decoding process 108 can then append the ASN received from the lookup service 112 to the URL of the content and generate a hash value based on the URL, the ASN, and the secret value shared with the web server 104. If the hash generated by URL decoding process 108 matches the hash extracted from the encoded URL, the content request will be considered valid and the content can be provided from an edge server 110 to the client device 102. In some embodiments, the URL decoding process 108 may first determine whether the request is valid before locating a cached version of the content in an edge server 110.

It will be understood that the ASN is only one of many ways that the URL can be encoded using an IP address. Other embodiments may use the IP address to generate a second value, be it an ASN, an Internet Service Provider (ISP) name, or any other value that can be generated using an IP address. The translation of an IP address to a second value also need not be a one-to-one relationship. The general concept of these embodiments takes a range of IP addresses that can be grouped together in some logical fashion. The grouping of IP addresses under an ASN or an ISP is merely exemplary and not meant to be limiting. Instead, these embodiments understand that a device's specific IP address may change during a communication session, and that the new IP address may likely fall within the same logical grouping as the old IP address. Therefore, these embodiments predict how a device IP might change dynamically, and encode URLs to compensate for this predicted change such that the communication session is not interrupted, destroying the user experience.

As will be described below, different values can be combined without limitation to generate an encoded URL. Various third-party services may be available that provide mappings between IP addresses and other identifying codes. For example, CYMRU® may provide a IP-to-ASN service. Therefore, use of the ASN in the example above is merely exemplary and not meant to be limiting. Furthermore, a URL may be encoded in many different ways using a code derived from an IP address such as an ASN. For example, many different hash formulas would be known to one having ordinary skill in the art, such as MD5, SHA-1, and so forth; thus the embodiments described herein are not limited to any particular hash function. Lookup services may such as the MaxMind® GeoIP2 Precision services may be used.

Embodiments that use an alternative to the IP address for encoding the URL can provide secure content links even when the client device 102 switches IP addresses. For example, when a smartphone 102-1 moves between base stations or is momentarily disconnected from a cellular data network, the IP address of the client device 102 may be reassigned. However, the embodiments described above will still provide valid content links to the client device 102 because the ASN of the cellular data network will typically not change as the smart phone 102-1 moves around. In effect, mapping the IP address to an ASN or ISP provides an additional layer of abstraction that is more general, or broader, than the IP address itself. This can still be used to thwart most hotlinking situations while providing a measure of flexibility to the customer.

Figure 1B:
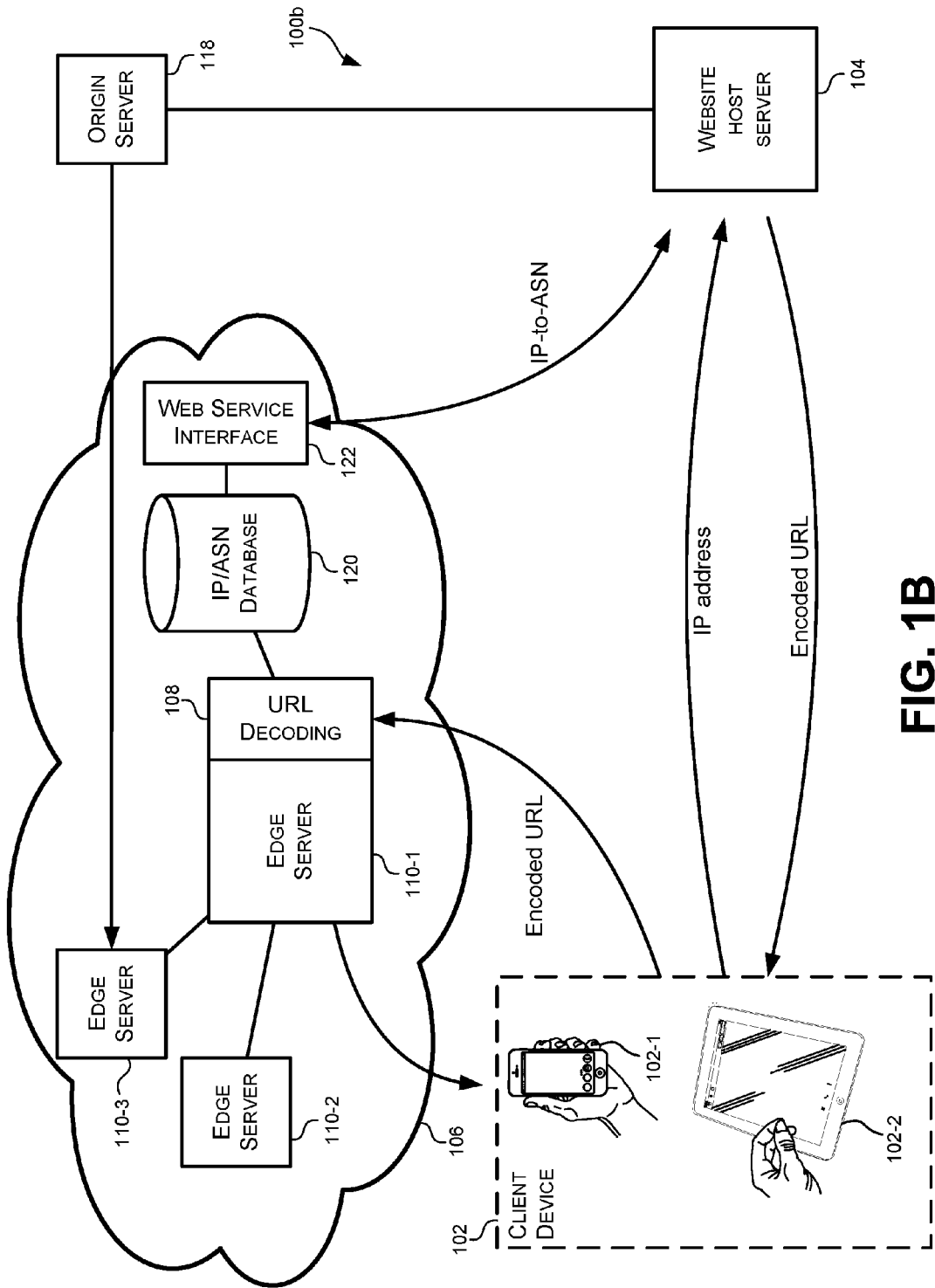
FIG. 1B illustrates a simplified block diagram of an alternate arrangement for a content delivery network and web server that use link security for content delivery, according to some embodiments.

FIG. 1B illustrates a simplified block diagram 100*b* of an alternate arrangement for a content delivery network and web server that use link security for content delivery, according to some embodiments. This embodiment is very similar to the embodiment of FIG. 1A, the difference being that the lookup service 112 is replaced with a process internal to the CDN 106. In this embodiment, the CDN 106 may maintain its own database 120 that maps IP addresses to other identifying codes, such as ASNs. Therefore, the URL decoding process 108 need not send a request to an external lookup service 112, but can instead query its own database 120 in order to generate a second identifying code for the client device 102. By maintaining its own database, the CDN 106 can often achieve a faster lookup time that is not dependent on the reliability of third-party services. Additionally, some embodiments may distribute the database 120 throughout the CDN 106 such that portions may be cached on edge servers 110 in the same way that customer content is cached on edge servers. The CDN 106 may break both content objects and portions of the database up into smaller objects that can be stored piecemeal throughout the CDN 106 and requested/reassembled when required. Therefore, the database 120 may be large and quite extensive, but the most used portions of the database (e.g., numbers relating to popular ASNs/ISPs) may be cached more readily throughout the CDN 106.

In this embodiment, the web server 104 still needs access to the database 120, or to a similar service 120 in order to generate the encoded URLs for content objects. In some embodiments, the web server 104 can continue to use a third-party site. Alternatively or additionally, the CDN 106 may provide a web service interface 122 or other API/interface such that the web server 104 can make a request to the CDN 106 for an IP address lookup. The web server can receive the IP address of the client device 102, and send the IP address to the CDN 106, which can then look up a second code (e.g., an ASN), and send the second code back to the web server 104. The web server can then use the second code received from the CDN 106 to generate an encoded URL as described above.

Figure 2A:
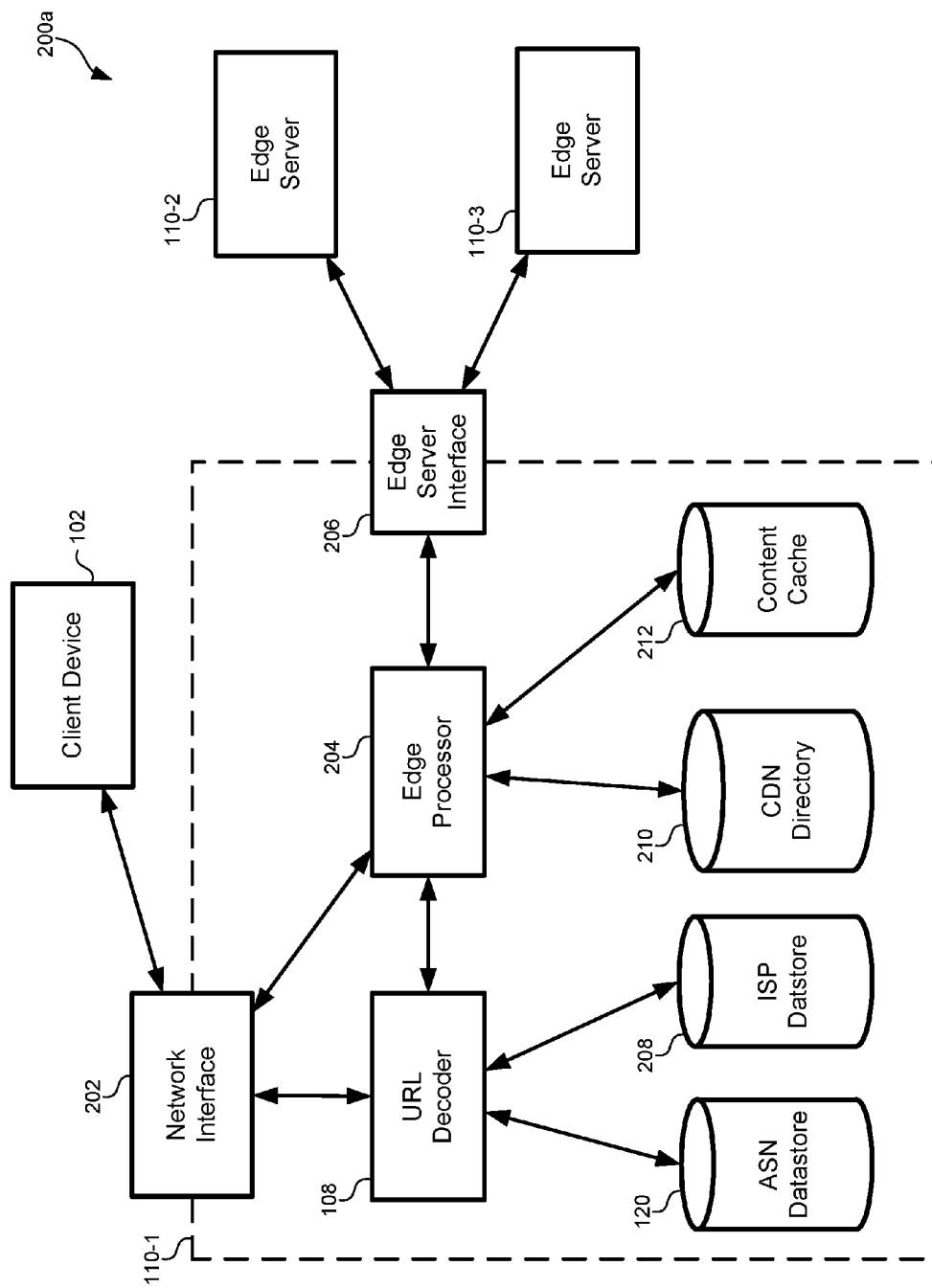
FIG. 2A illustrates a simplified block diagram of an edge server with integrated IP lookup capability, according to some embodiments.

FIG. 2A illustrates a simplified block diagram 200*a* of an edge server with integrated IP lookup capability, according to some embodiments. This edge server 110-1 is similar to the edge server 110-1 depicted in FIG. 1B with an integrated URL decoding process 108. The edge server 110-1 may include an edge processor 204 which may comprise a multi-core set of processors that are programmed to receive content requests from a client device 102 and retrieve content from a cache stored in edge servers throughout the CDN 106. A network interface 202 can receive requests from the client device 102 and send the encoded URL to the URL decoding process 108. In some embodiments, a data store of codes that can be derived from an IP address may be integrated with the edge server 110-1. In this particular embodiment, an ASN data store 120 may be included and may receive an IP address from the URL decoding process 108 and provide a corresponding ASN. Other data stores may include an ISP data store 208 that similarly accepts an IP address and returns a corresponding ISP name. As described above, the URL decoding process 108 may make a determination as to whether the encoded URL received from the client device 102 is valid, for example, by appending the ASN/ISP to the raw URL and generating a hash value that may be compared to a hash value in the encoded URL.

The processor 204 can receive the encoded URL from the network interface 202 and immediately begin searching the CDN cache for responsive content. A CDN directory 210 can provide the edge processor 204 with information regarding where the responsive content may be stored in the CDN 106. Additionally, each edge server 110 may include a content cache 212 that stores cached versions of content from the customer. The edge processor 204 can determine whether the content cash 212 stored locally at the edge server 110-1 includes the responsive content. If not, the edge processor 204 can communicate with other edge servers 110 through an edge server interface 206 in order to retrieve the responsive content from other edge servers 110 in the same PoP or in other PoPs throughout the CDN 106. In some embodiments, the edge processor 204 can stop looking for responsive content as soon as the URL decoding process 108 determines that the encoded URL is invalid. Alternatively, some embodiments may prevent the edge processor 204 from searching for responsive content until after the URL decoding process 108 determines that the encoded URL is valid. In some embodiments, the network interface 202 and the edge server interface 206 may comprise the same interface and may be implemented using network communication ports.

Figure 2B:
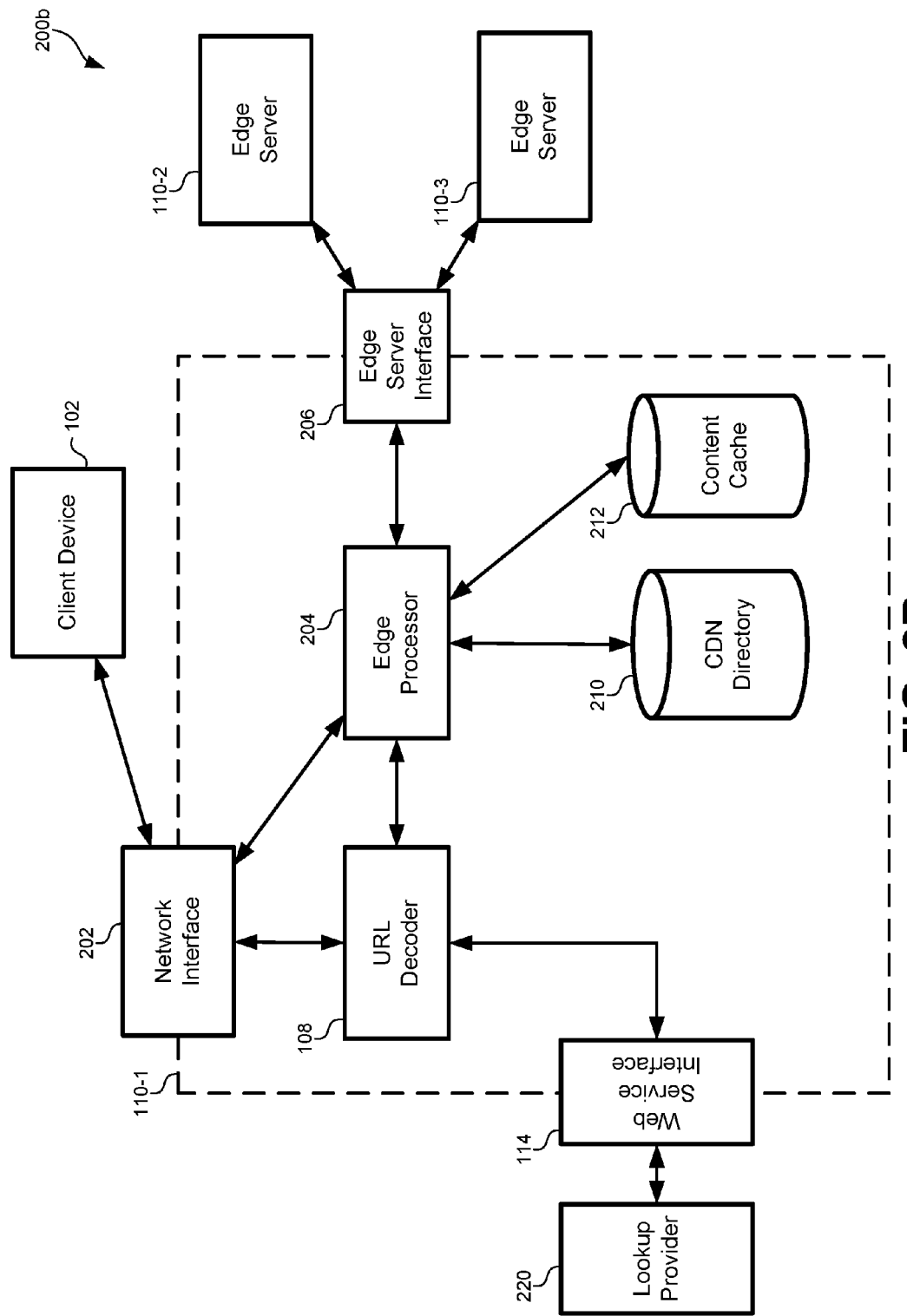
FIG. 2B illustrates a simplified block diagram of an edge server with third-party IP lookup capability, according to some embodiments.

FIG. 2B illustrates a simplified block diagram 200b of an edge server with third-party IP lookup capability, according to some embodiments. This embodiment of the edge server 110-1 is very similar to that of FIG. 2A, the difference being that the code lookup functionality is not integrated in the edge server 110-1, but rather is provided by an external process. In this embodiment, the URL decoding process 108 can interface through a web service interface 114 with a lookup provider 220, possibly provided by third-party. In some embodiments, the lookup provider 220 may be external to the CDN 106 and operated by an entity that is different from the entity operating the CDN 106. In some embodiments, the lookup provider 220 may be external to the edge server 110-1, but internal to the CDN 106. For example, each PoP may include its own lookup service 220 for each type of code derived from an IP address. In other embodiments, the CDN 106 may store one central lookup service 220 for the entire CDN 106. The lookup provider 220 in the CDN 106 may be implemented using a database that stores codes such as ASNs/ISPs that can be indexed using an IP address as a primary key.

FIG. 3 illustrates an encoding of a URL 300, according to some embodiments. The encoded URL 300 may include a pathname that is traditionally used to access content over a network. The pathname may include a domain 302 and the name of a content object 304. Following the pathname, the web server 104 may append various parameters that include codes derived from an IP address. In some embodiments, more than one code derived from the IP address may be appended to the pathname of the content. In this example, an ISP 306 and an ASN 308 may be determined based on the IP address of the client device and appended to the encoded URL 300. Although not shown, the IP address itself may also be appended, along with any other codes 310 that may be derived from the IP address or from another characteristic of the client device or from the content request itself.

Next, a hash value 312 may be appended to the end of the encoded URL and used by the CDN 106 for determining validity of the encoded URL. In some embodiments, the hash value 312 may be determined by providing the encoded URL 300 (excluding hash value 312, of course) to a one-way hash function along with a secret value that is shared between the CDN 106 and the web server 104. The full encoded URL 300 can be transmitted to the client device with the rest of the HTML code for the webpage. When the encoded URL 300 is transmitted to the CDN 106, the CDN can follow the same process, i.e. using the IP address in the link layer to generate one or more codes (e.g. ISP, ASN, etc.), append those codes to the pathname, and generate a hash using the secret value. The hash 312 in the encoded URL 300 can then be compared to the hash calculated by the CDN 106 in order to determine if the link is valid.

Figure 4:
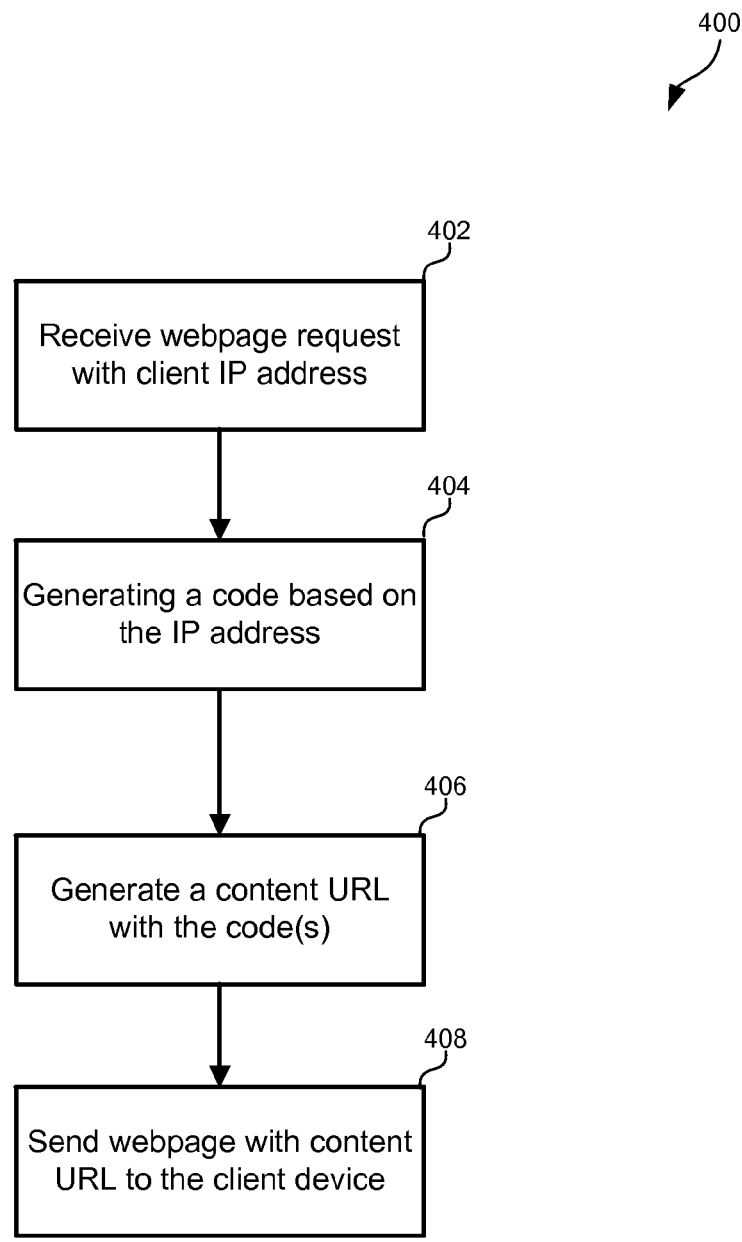
FIG. 4 illustrates a flowchart of a method for generating an encoded URL for content delivery, according to some embodiments.

FIG. 4 illustrates a flowchart of a method 400 for generating an encoded URL for content delivery, according to some embodiments. This method may be carried out by the web server 104 of the customer. The method may include receiving a webpage request from a client device (402). The request may include an IP address, for example, in the link layer of the transmission from the client device. The webpage will be hosted by the web server, and content objects to be displayed/played on the webpage may be the stored in the CDN 106. The method may also include generating a code based on the IP address (404). In some embodiments, the code may be generated by sending the IP address to a third-party service that retrieves the code based on the IP address. For example, the IP address may be used to look up an ASN or ISP name for the client device or the network through which the client device is communicating. In other embodiments, the web server 104 can instead access a lookup service that is part of the CDN 106, or a lookup service that is a part of the web server 104 itself. For example, the web server 104 may include a database that is synced with the similar database in the CDN 106.

The method may additionally include generating an encoded URL using the code (406). The encoded URL may be generated using the code and the file path of the content object as inputs. Another input may include a secret value that is shared between the CDN 106 and the web server 104. As described above, the encoded URL may include the code (e.g. ASN, ISP name) appended to the file path of the content object along with a hash generated from these values. The method may further include sending the webpage with the encoded URL to the client device (408). The webpage may include instructions for displaying the webpage on the client device in a language that may be interpreted by a web browser, such as HTML, which can use the encoded URL to request content objects from the CDN 106.

Figure 5A:
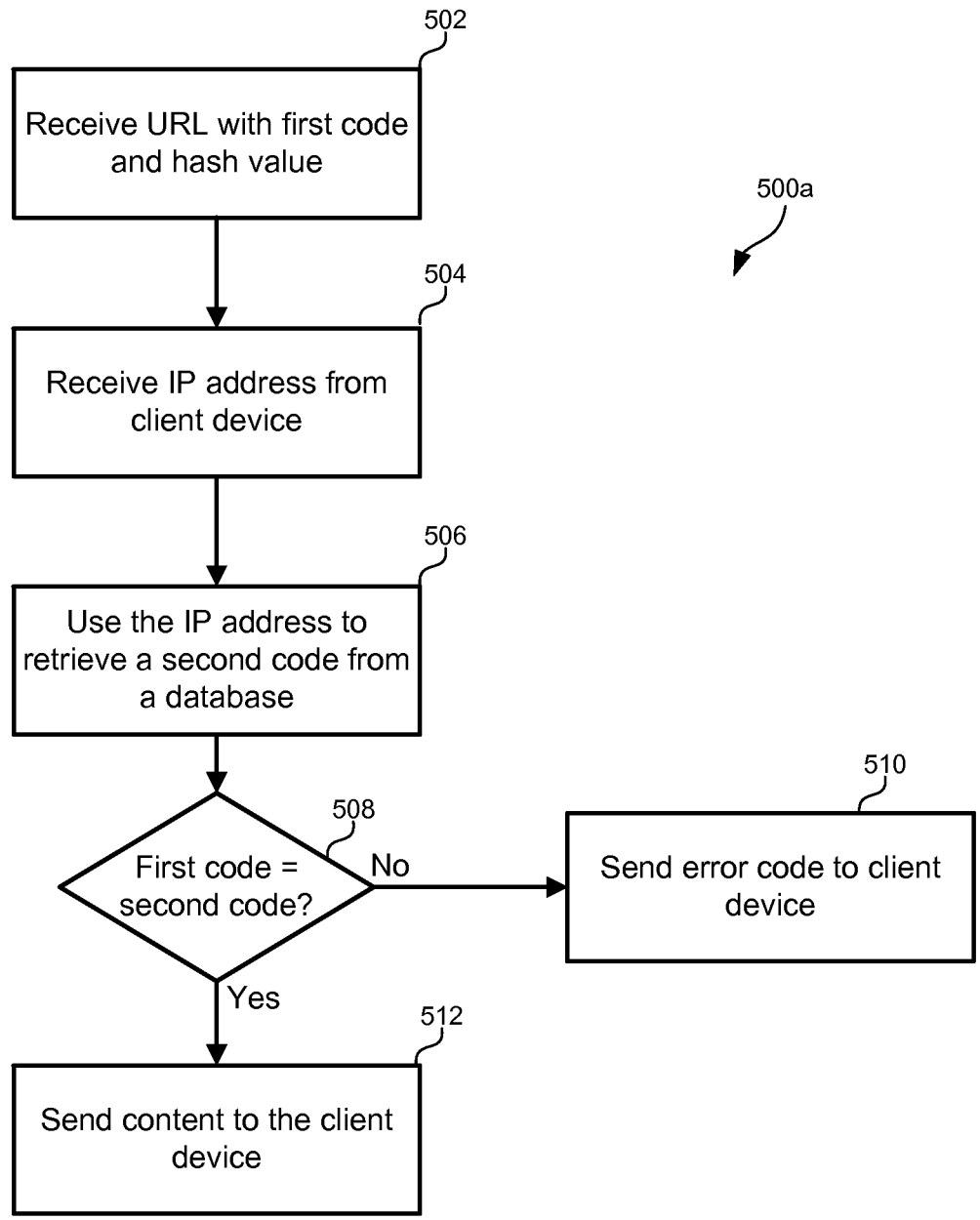
FIG. 5A illustrates a flowchart of a method for validating an encoded URL for content delivery, according to some embodiments.

FIG. 5A illustrates a flowchart 500a of a method for validating an encoded URL for content delivery, according to some embodiments. This method may be carried out by a server in the CDN 106, such as edge server 110-1. The method may include receiving an encoded URL (502). The encoded URL may include one or more codes (i.e., a "first code"), and in some cases may also include a hash value. The encoded URL may be part of a request for content sent from a client device that is attempting to load, display, and/or play a content object associated with the webpage from the customer. The method may also include receiving an IP address from the client device (504). As described above, the first code may include an ASN, an ISP identifier, or another number that is associated with a group of IP addresses.

The method may additionally include using the IP address received from the client device to retrieve a second code from a database (506). The database may be provided by a third-party service through a web interface, provided by the CDN 106 itself, and/or shared between the CDN 106 and the web server 104. The method may further include determining whether the first code matches the second code (508). For example, an ASN sent as part of the encoded URL could be compared to an ASN retrieved from the database based on the IP address of the client device. In some embodiments, a hash value may also be calculated using the ASN retrieved from the database and compared to a hash value sent with the encoded URL. Therefore, some embodiments may check to make sure that the code sent from the client device and the code retrieved from the database based on the IP address of the client device match, and verify that the encoded URL has not been altered by comparing the hash value of the encoded URL to the hash value computed based on the code retrieved from the database. If the encoded URL is determined to be valid (e.g. has an unaltered URL and is sent from an ASN that matches the code in the URL) then the CDN can look up and send the content to the client device (512). If the URL is not valid (e.g. has an altered URL or is sent from an ASN that does not match the code in the URL) then the CDN can send an error code to the client device (510). For example the error code may be an "HTTP 404—File or Directory Not Found" error message or an "HTTP 403—Access Denied/Forbidden" error message.

As mentioned above, some embodiments may use different groupings of IP addresses in order to generate a code for the encoded URL. The ASN is but one example of this type of grouping. In some embodiments, the CDN may generate its own groupings of IP addresses. These groupings may correspond to known customers or customers registered with a particular service of the CDN. These groupings may also be categorized according to user. For example, a particular client device may commonly be used through a user's home Wi-Fi network, which will be associated with the IP address of the home router. In addition to an IP address, a request to the CDN for content may also include a client device ID, a username, or some other means of identifying a user account associated with the user and/or the client device. This user account can store known IP addresses from which the user and/or client device connect to the CDN. For example, if a client device initially connects to the Web server and CDN through a mobile cellular network, the IP address will be assigned by the mobile cellular network. If the user then walks into his/her home, the IP address may change to the IP address of the home router, which would normally invalidate the encoded URLs. The encoded URLs using the IP address of the cellular data network would no longer be valid after the client device began connecting to the Internet through the home Wi-Fi network. However, the CDN can keep a user-specific database of known IP addresses for that particular user, which would include the IP address of the home router. The encoded URLs would include a string identifier corresponding to the group of IP addresses for that user. This string identifier could also be included as a parameter in the encoded URL.

In other embodiments, the CDN will maintain a "white list" of IP addresses that should be considered valid and not subject to content restrictions. Additionally, other security measures may be built into the encoded URL. For example, the encoded URL may be generated using a timestamp that expires after a time interval, such as one hour. In determining whether an encoded URL is valid, the hash can be calculated and compared by the CDN, any codes derived from the IP address of the client device can be compared to corresponding codes in the encoded URL, and any other restrictions, such as a timestamp, can be checked for compliance.

Figure 5B:
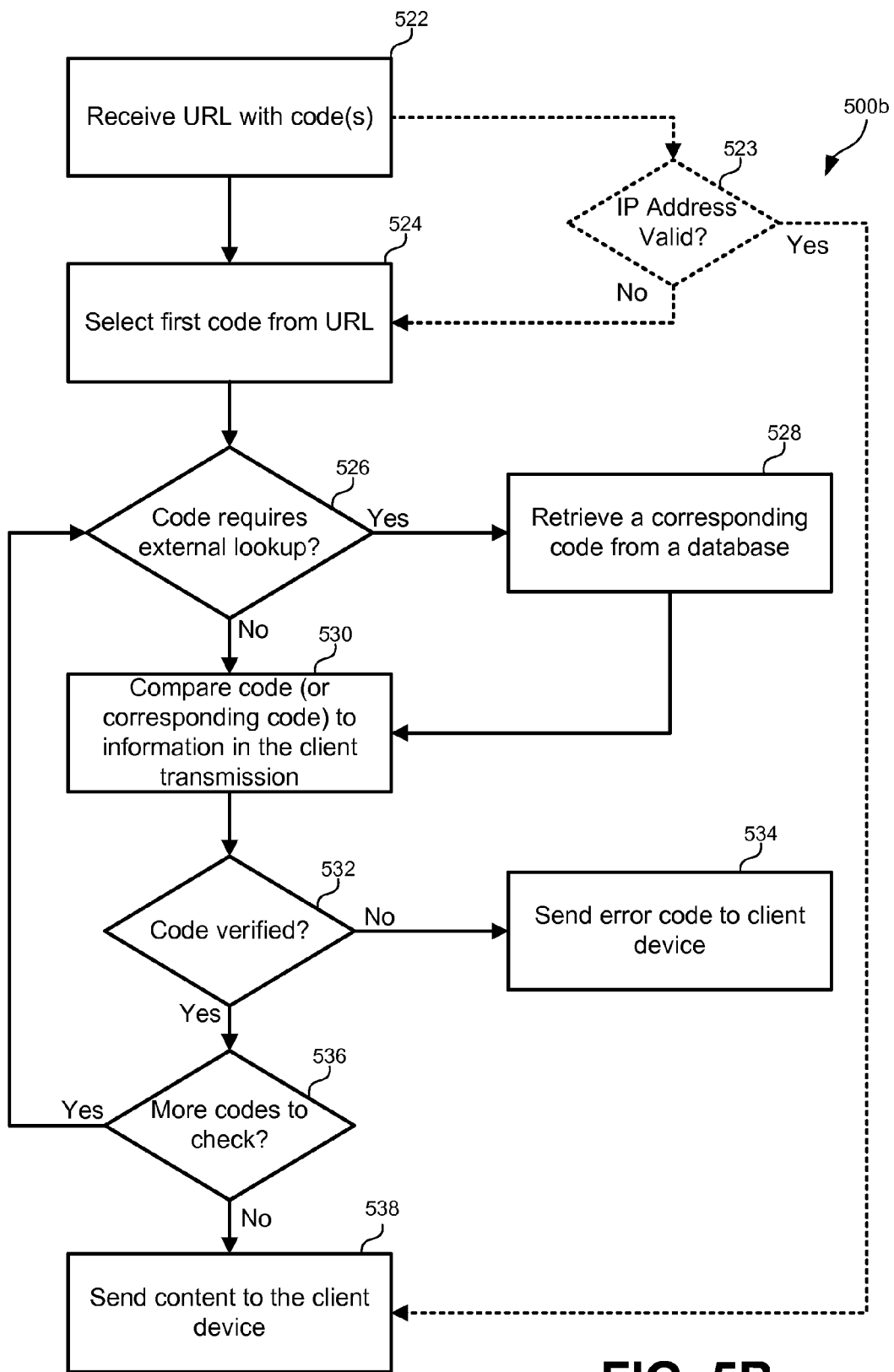
FIG. 5B illustrates a flowchart of a method for validating an encoded URL with multiple codes, according to some embodiments.

FIG. 5B illustrates a flowchart 500*b* of a method for validating an encoded URL with multiple codes, according to some embodiments. In this embodiment, more than one code can be included in the encoded URL. Each code can be sequentially checked by the CDN 106 in order to determine if all the codes are valid, some of the codes are valid, or none of the codes are valid, depending on the embodiment. The method may include receiving an encoded URL with one or more codes (522). In some embodiments, the codes may be appended to the end of the file path of the content object as HTML parameters.

In some embodiments, the CDN can first check the IP address to determine whether it is valid (523). Checking the IP address does not require looking up any additional codes or querying a database or third-party service. If the IP address of the link layer from the client device matches the IP address included in the encoded URL, and the hash value indicates that the encoded URL has not been tampered with, then it may be determined at this point that the link is valid in the content should be retrieved (538). If instead the IP address does not match, then the CDN may proceed by sequentially checking each code in the encoded URL for validity. This may indicate a situation where the link is valid, but the IP address of the client device (e.g. a smart phone) may have been reassigned during the same web session with the web server. Note that this step may be optional in some embodiments.

The method may also include selecting a first code from the encoded URL (524). The CDN can store preferences that determine which codes should be checked for validity and the order in which they should be checked. If the code requires external lookup (526), then a database can be queried either by the CDN or by a third party service to retrieve a corresponding code from the database (528). The corresponding code may be retrieved based on the IP address sent with the content request from a client device. Using the examples described above, this may entail looking up an ASN based on the client device IP address. Note that in some embodiments, the code will not require external lookup and may instead be included as part of the transmission in one of the other layers of the OSI model. The corresponding code retrieved using the IP address (or the original code itself) can be compared to the code embedded in the encoded URL (530).

As the method sequentially checks each code to determine whether the encoded URL is valid, detecting invalid/valid codes can have different effects on the process, depending on the particular embodiment. In the embodiment of flowchart 500*b*, each code must be verified in order for the link to be valid. For example, an ASN, and an ISP name may both need to be found valid in order for the CDN to send the content to the client device (538). In other embodiments not shown here explicitly, the codes may be layered such that if one is found to be invalid, the next code can be checked. Only if each code is invalid will the error message be sent to the client device (534). As soon as a single code is found to be valid, the content could then be sent to the client device (538). In other words, the CDN operator can evaluate the trade-off between link security and user convenience. If it is more important to the CDN operator that links be secure and bandwidth not be wasted on hotlinking, then the CDN may require each code to be valid before content is sent. On the other hand, if it is more important to the CDN operator that users receive the benefit of the doubt and have access to content, then the CDN may require only a single code to be valid before the content is sent.

Figure 6:
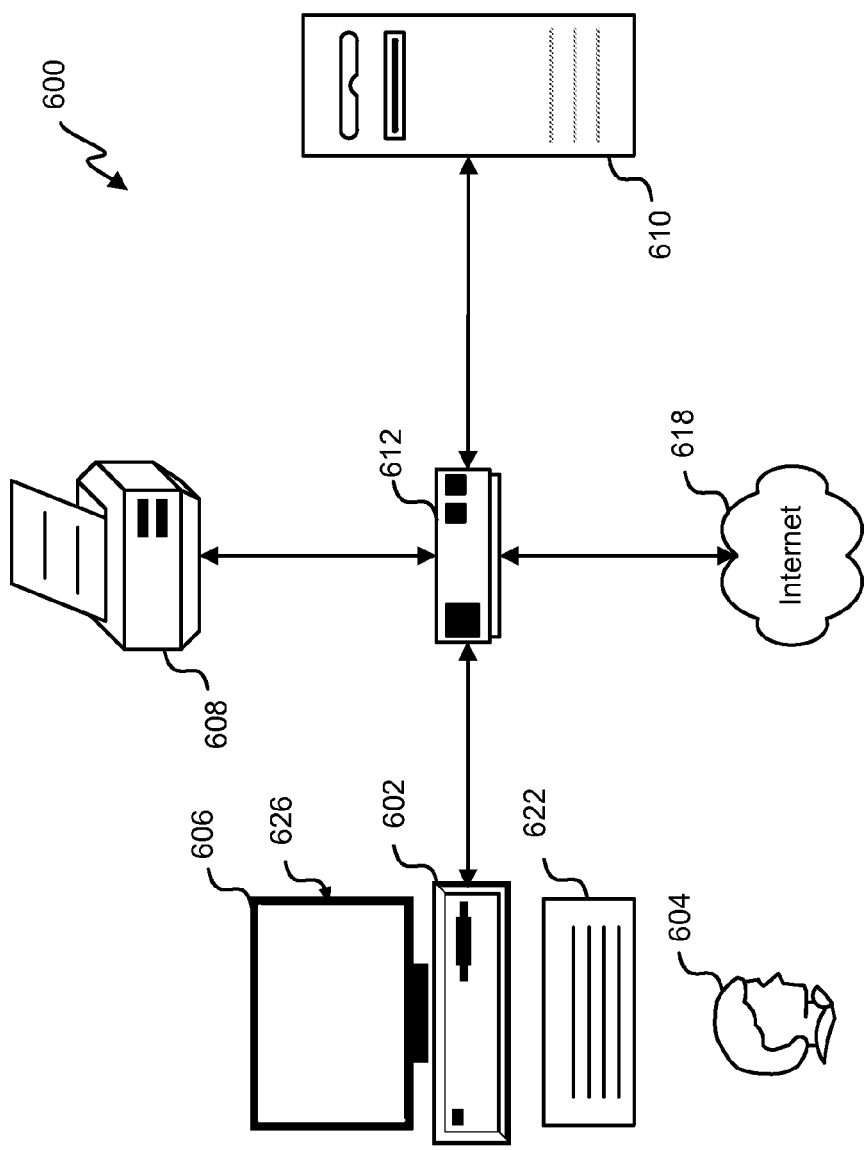
FIG. 6 illustrates an exemplary environment in which embodiments may be implemented, according to some embodiments.

FIG. 6 illustrates an exemplary environment in which embodiments may be implemented, according to some embodiments. Embodiments may be implemented in a computer system 600. The computer system 610 can include a computer 602, an optional keyboard 622, a network router 612 or other routing fabric, an optional printer 608, and an optional monitor 606. The monitor 606, processor 602 and keyboard 622 are part of a computer system 626, which can be a laptop computer, desktop computer, handheld computer, rack-mounted computer, mainframe computer, etc. The monitor 606 can be a CRT, flat screen, remote terminal, etc.

A user 604 can input commands into the computer 602 using various input devices, such as a mouse, keyboard 622, track ball, touch screen, etc. If the computer system 600 comprises a mainframe, a designer 604 can access the computer 602 using, for example, a terminal or terminal interface. Additionally, the computer system 626 may be connected to a printer 608 and a server 610 using a network router 612, which may connect to the Internet 618 or a WAN. Computer 602 may correspond to a client device described elsewhere herein.

The server 610 may, for example, be used to store additional software programs and data. In one embodiment, software implementing the systems and methods described herein can be stored on a storage medium in the server 610. Thus, the software can be run from the storage medium in the server 610. In another embodiment, software implementing the systems and methods described herein can be stored on a storage medium in the computer 602. Thus, the software can be run from the storage medium in the computer system 626. Therefore, in this embodiment, the software can be used whether or not computer 602 is connected to network router 612. Printer 608 may be connected directly to computer 602, in which case, the computer system 626 can print whether or not it is connected to network router 612. The server 610 may correspond to a CDN edge server as described elsewhere herein.

Figure 7:
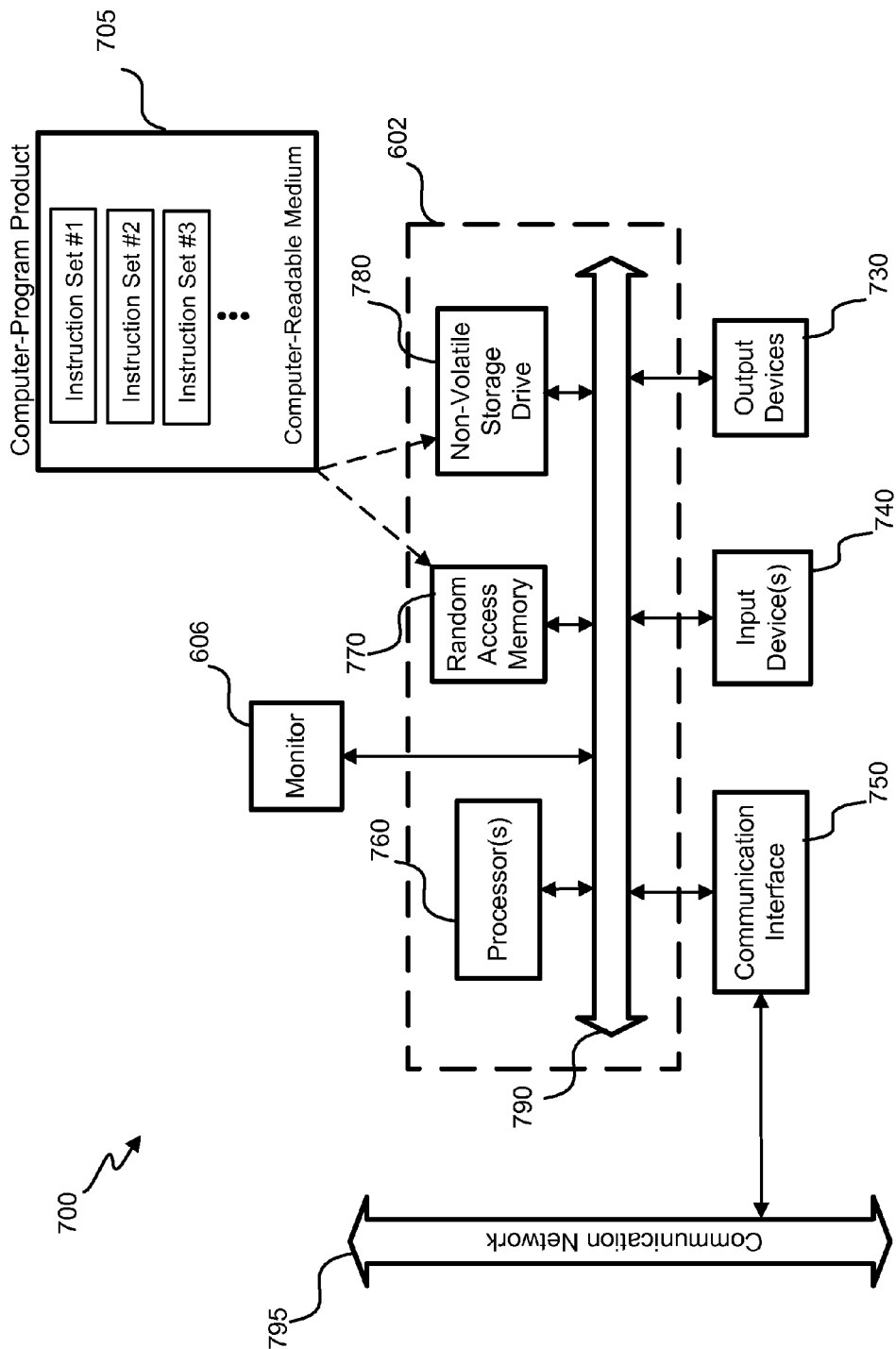
FIG. 7 illustrates an embodiment of a special-purpose host computer system, according to some embodiments.

FIG. 7 illustrates an embodiment of a special-purpose host computer system 700, according to some embodiments. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose host computer system 700.

Special-purpose host computer system 700 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs host computer system 600 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 602 and loaded into memory 770. Each processor 760 may comprise a microprocessor, such as a microprocessor from Intel® or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft Corporation, Solaris® from Oracle®, LINUX, UNIX, and the like.

User input devices 740 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These may include a display (e.g., monitor 606), printers, non-visual displays such as audio output devices, etc.

Communications interface 750 provides an interface to other communication networks and devices and may serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem may utilize multiple busses or communication paths within the computer 602.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A Content Delivery Network (CDN) comprising:
   a plurality of Points of Presence (PoPs) that are geographically distributed;
   a plurality of edge servers that are distributed among the PoPs, the plurality of edge servers storing content and responding to content requests; and
   an edge server in the plurality of edge servers, the edge server being configured to:
   receive, from a client device, a request for content, wherein the request for content comprises:
      a first Internet Protocol (IP) address from a first network layer of the request for content; and
      a Uniform Resource Locator (URL) comprising a first code identifying a first Internet Service Provider (ISP) or a first Autonomous System Number (ASN), wherein:
         the first code was generated by a web server using a second IP address to look up the first ISP or first ASN; and
         the second IP address was from a second network layer of a request for a webpage from the web server;
   generate a second code identifying a second ISP or a second ASN, wherein:
      the second code is generated by the CDN using the first IP address to look up the second ISP or second ASN;
   determine whether the first code matches the second code even if the first IP address is not the same as the second IP address;
   if the first code matches the second code, send content that is responsive to the request for content to the client device;
   if the first code does not match the second code, deny access to the content that is responsive to the request for content.

2. The CDN of claim 1, wherein generating the second code comprises looking up the second code in a database that is indexed using the first IP address, wherein the database in internal to the CDN.

3. The CDN of claim 1, wherein generating the second code comprises:
   sending the first IP address to a third-party service through a web interface, wherein the third-party service comprises a database of codes that can be retrieved using IP addresses; and
   receiving the second code from the third-party service.

4. The CDN of claim 1, wherein the URL further comprises a first hash value, the edge server being further configured to:
compute a second hash value from a portion of the URL that excludes the first hash value; and
determine whether the second hash value matches the first hash value.

5. The CDN of claim 1, the edge server being further configured to:
before receiving the request for content from the client device:
receive the second IP address from the web server;
provide the first code using the second IP address; and
send the first code to the web server, wherein the web-server uses the first code to generate the URL.

6. The CDN of claim 1, wherein the second code corresponds to a range of valid IP addresses.

7. A method of securely providing access to web content in a network:
receiving, at a server in a Content Delivery Network (CDN) and from a client device, a request for content, wherein the request for content comprises:
a first Internet Protocol (IP) address from a first network layer of the request for content; and
a Uniform Resource Locator (URL) comprising a first code identifying a first Internet Service Provider (ISP) or a first Autonomous System Number (ASN), wherein:
the first code was generated by a web server using a second IP address to look up the first ISP or first ASN; and
the second IP address was from a second network layer of a request for a webpage from the web server;
generating a second code identifying a second ISP or a second ASN, wherein:
the second code is generated by the CDN using the first IP address to look up the second ISP or second ASN;
determining, by the server, whether the first code matches the second code even if the first IP address is not the same as the second IP address;
if the first code matches the second code, sending content that is responsive to the request for content to the client device;
if the first code does not match the second code, denying access to the content that is responsive to the request for content.

8. The method of claim 7, wherein generating the second code comprises looking up the second code in a database that is indexed using the first IP address, wherein the database in internal to the CDN.

9. The method of claim 7, wherein generating the second code comprises:
sending the first IP address to a third-party service through a web interface, wherein the third-party service comprises a database of codes that can be retrieved using IP addresses; and
receiving the second code from the third-party service.

10. The method of claim 7, wherein the URL further comprises a first hash value, the method further comprising:
computing a second hash value from a portion of the URL that excludes the first hash value; and
determining whether the second hash value matches the first hash value.

11. The method of claim 7, further comprising:
before receiving the request for content from the client device:
receive the second IP address from the web server;
provide the first code using the second IP address; and
send the first code to the web server, wherein the web-server uses the first code to generate the URL.

12. The method of claim 7, wherein the second code corresponds to a range of valid IP addresses.

13. A non-transitory, computer readable medium for a Content Delivery Network (CDN), the medium comprising instructions that, when executed by one or more processors, causes the one or more processors to:
receive, from a client device, a request for content, wherein the request for content comprises:
a first Internet Protocol (IP) address from a first network layer of the request for content; and
a Uniform Resource Locator (URL) comprising a first code identifying a first Internet Service Provider (ISP) or a first Autonomous System Number (ASN), wherein:
the first code was generated by a web server using a second IP address to look up the first ISP or first ASN; and
the second IP address was from a second network layer of a request for a webpage from the web server;
generate a second code identifying a second ISP or a second ASN, wherein:
the second code is generated by the CDN using the first IP address to look up the second ISP or second ASN;
determine whether the first code matches the second code even if the first IP address is not the same as the second IP address;
if the first code matches the second code, send content that is responsive to the request for content to the client device;
if the first code does not match the second code, deny access to the content that is responsive to the request for content.

14. The medium of claim 13, wherein generating the second code comprises looking up the second code in a database that is indexed using the first IP address, wherein the database in internal to the CDN.

15. The medium of claim 13, wherein generating the second code comprises:
sending the first IP address to a third-party service through a web interface, wherein the third-party service comprises a database of codes that can be retrieved using IP addresses; and
receiving the second code from the third-party service.

16. The medium of claim 13, the edge server being further configured to:
before receiving the request for content from the client device:
receive the second IP address from the web server;
provide the first code using the second IP address; and
send the first code to the web server, wherein the web-server uses the first code to generate the URL.

* * * * *